(12) United States Patent
Sutton (10) Patent No.: US 7,275,020 B2
(45) Date of Patent: Sep. 25, 2007

(54) METHOD AND SYSTEM FOR TESTING A COMPUTER SYSTEM BY APPLYING A LOAD

(75) Inventor: Zhihong Sutton, Campbell, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 693 days.

(21) Appl. No.: 10/742,776

(22) Filed: Dec. 23, 2003

(65) Prior Publication Data

US 2005/0193258 A1    Sep. 1, 2005

(51) Int. Cl.
    *G06F 19/00* (2006.01)
(52) U.S. Cl. .......................... 702/186; 701/29
(58) Field of Classification Search .......... 702/186, 702/182–185, 188, 113–115, 121–123; 370/232; 701/29, 31–32, 35; 714/25
    See application file for complete search history.

(56) References Cited

U.S. PATENT DOCUMENTS

| | | | |
|---|---|---|---|
| 5,500,941 A | 3/1996 | Gil | |
| 5,974,572 A | 10/1999 | Weinberg et al. | |
| 6,182,245 B1 | 1/2001 | Akin et al. | |
| 6,735,553 B1 * | 5/2004 | Frogner et al. | 702/186 |

FOREIGN PATENT DOCUMENTS

| | | |
|---|---|---|
| JP | 04-237359 | 8/1992 |
| JP | 09-160842 | 6/1997 |
| JP | 2000-357105 | 12/2000 |

* cited by examiner

*Primary Examiner*—Edward Raymond (57) ABSTRACT

A method for testing a computer system by applying a load includes receiving a load specification, the load specification identifying at least one resource of the system and specifying a load for application to the resource, and for each resource identified in the load specification, applying the corresponding specified load to the resource. A machine readable medium can include software or a computer program or programs for causing a computing device to perform the exemplary method.

35 Claims, 6 Drawing Sheets

METHOD AND SYSTEM FOR TESTING A COMPUTER SYSTEM BY APPLYING A LOAD

BACKGROUND

U.S. Pat. No. 6,182,245 to Akin, et al. is directed to a software test case client/server system that provides selective access to a central repository of test case data-used in testing a software program. A test case server stores and manages test case data in a central repository. A test client communicates between a test program and the test server to identify tests case data, and versions of such data, with desired read/write status required in testing a software program. A test program automates selection of test case data, software program test execution, and verification of software program results. In an exemplary embodiment, symbolic links and copies of test case data are recorded in a destination directory structure accessible by a software program under test. In an alternate embodiment, a revision control system (RCS) is used to access the central repository and provide copies of selected test case data in a destination directory structure accessible by a software program under test. A method for communicating and implementing the desired test case access includes instructions initiated by a test client and received by a test server. A central repository administration application allows a user to organize, supplement and otherwise manage test case data and versions of such data. The client/server configuration further facilitates access by a plurality of users to a shared central repository of test case data without corrupting the test case data therein.

U.S. Pat. No. 5,974,572 to Weinberg, et al. is directed to a visual Web site analysis program that is implemented as a collection of software components and provides a variety of features for facilitating the analysis, management and load-testing of Web sites. A mapping component scans a Web site over a network connection and builds a site map which graphically depicts the URLs and links of the site. Site maps are generated using a unique layout and display methodology which allows the user to visualize the overall architecture of the Web site. Various map navigation and URL filtering features are provided to facilitate the task of identifying and repairing common Web site problems, such as links to missing URLs. A dynamic page scan feature enables the user to include dynamically-generated Web pages within the site map by capturing the output of a standard Web browser when a form is submitted by the user, and then automatically resubmitting this output during subsequent mappings of the site. An Action Tracker module detects user activity and behavioral data (link activity levels, common site entry and exit points, etc.) from server log files and then superimposes such data onto the site map. A Load Wizard module uses this activity data to generate testing scenarios for load testing the Web site.

U.S. Pat. No. 5,500,941 to Gil is directed to a method of performing software validation testing on large electronic systems, that applies Usage Concepts specially modeled as Markov chains to fore-realize the expected use of a system, to define the system behavior, and to introduce statistical measurements. The functional requirements of the software system are defined in a Markov chain by identifying a plurality of states through which the software system transitions when performing the functional requirements. Stimuli and responses which cause the software system to transition from one state to another are identified, and the probability of each state transition is calculated. Usage cases beginning at an invocation state and ending at a termination state of the software system are defined and listed in order of descending probability of occurrence in a Usage Profile. The Usage Profile, stimuli, and responses are automatically compiled into an automated test program, and associated test equipment is automatically programmed to generate a set of test cases. The set of test cases are then executed on the software system. The end of the set of test-cases is determined, and the method analyzes and reports the software system quality.

SUMMARY

A method for testing a computer system by applying a load includes receiving a load specification, the load specification identifying at least one resource of the system and specifying a load for application to the resource, and for each resource identified in the load specification, applying the corresponding specified load to the resource. A machine readable medium can include software or a computer program or programs for causing a computing device to perform the exemplary method.

A device for testing a computer system by applying a load includes a) software installed on the computer system, wherein the software is configured to receive a load specification, the load specification identifying at least one resource of the system and specifying a load for application to the resource, and wherein for each resource identified in the load specification, the software is configured to apply the corresponding specified load to the resource, b) means for monitoring a load of the at least one resource, and a display for displaying at least one of the monitored load and the load specification.

A testing system for testing a computer system, includes means for applying to at least one computer system resource identified in a load specification, a corresponding load specified in the load specification, wherein the load specification specifies a magnitude of the load, and means for monitoring a load experienced by the at least one resource.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
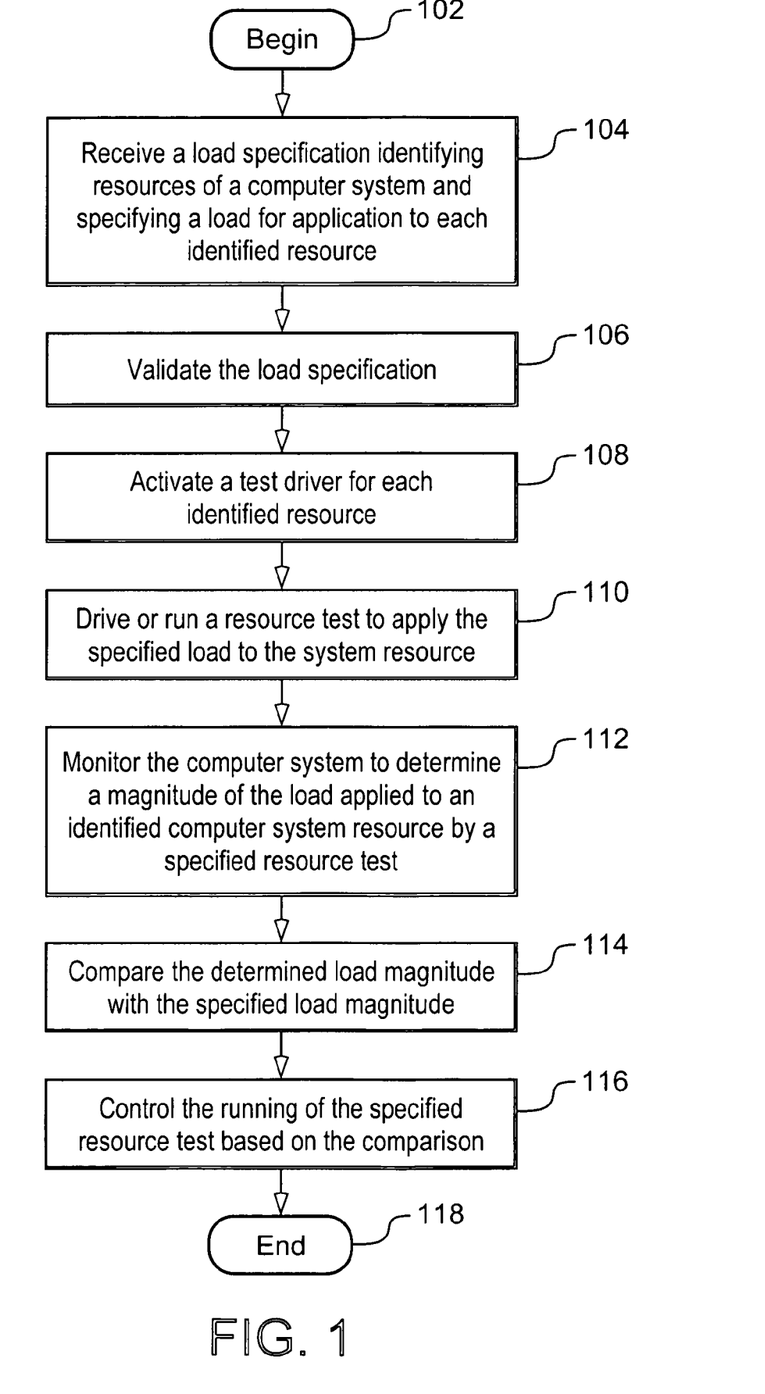
FIG. 1 illustrates an exemplary method.

As shown in FIG. 1, in a first block 102 a process begins, and then in a next block 104 a load specification is received that identifies resources of a computer system and specifies a load for application to each identified resource. Exemplary computer system resources include, but are not limited to: volatile memory; static or non-volatile memory; one or more hard disk drives; optical drives; network input/output (I/O); and CPU (Central Processing Unit). The load specification can be a file provided by a user, a file retrieved from storage, and/or information entered by the user via a GUI (Graphical User Interface). The load specification can be automatically generated based on information provided by a user, for example based on general parameters provided by the user.

In a next block 106, the load specification is validated. For example, the load specification can be reviewed or parsed and analyzed to check for proper syntax, values, completeness, and so forth. This validation can be performed by a process, for example a daemon. The process can be configured to receive the load specification in block 104. In a block step 108, a test driver is activated for each resource identified in the load specification. The daemon mentioned herein can, for example, activate test drivers corresponding to the system resources identified in the load specification. In a next block 110, a resource test is run to apply the specified load to the identified system resource. The resource test can be run or driven, or supervised, by the test driver corresponding to the resource. Different resource tests for the same resource can be run sequentially and/or simultaneously, for example as directed by the test driver. A resource test can also be instantiated multiple times, for example so that different instances of the resource test can be run at the same time or at different times.

In a next block 112, the computer system under test is monitored to determine a magnitude of the load applied to an identified resource of the computer system by a specified resource test. This monitoring can be performed by a process such as the daemon mentioned herein, or can be performed by separate software that monitors performance and status of the computer system according to various measures and parameters. In other words, the monitoring software or mechanism can monitor an actual load experienced by a computer system resource. The monitoring software can be existing off-the-shelf software products available for example from Hewlett-Packard Company or Computer Associates International, Incorporated. In other words, the monitoring provides a measure of the actual load applied to the identified system resource. The monitoring software can be implemented as modules or agents, running for example on the system under test and/or on computer(s) connected to the system under test, can be implemented in a distributed fashion, and so forth.

In a next block 114, the determined load magnitude determined in block 112 is compared with the load magnitude specified in the load specification. This comparison can be performed, for example, by the test driver. In a next block 116, the running of the specified resource test is controlled based on the comparison result from block 114. For example, if the comparison indicates that the measured or determined load is less than the specified load, then operation of the resource test can be adjusted to increase the measured or determined load. Conversely, if the measured or determined load is greater than the specified load, then operation of the resource test can be adjusted to decrease the measured load, and thus match the actual or measured load with the desired or specified load or make them more consistent with each other. This controlling and adjusting of the resource test can be performed for example by the corresponding test driver. In a next block 118, the process ends.

Those skilled in the art will appreciate that the process described in FIG. 1 can be modified consistent with various embodiments, for example control can return to block 112 from block 116 to provide a continuous process or subprocess. In a further example, the load specification can include indications of a load magnitude, a load duration, a beginning time for the load duration, an ending time for the load duration, a variation of the load magnitude over the load duration, and so forth. For example, the variation can be represented by any function (continuous or non-continuous) of time having a desired value at each point in time. The indication of load magnitude can, for example, be expressed as a value representing a percentage of a maximum load for the corresponding system resource, e.g., "90" or "0.90" representing 90% of a maximum load, and so forth. In a further example, the process shown in FIG. 1 can be adapted so that a user can alter one or more parameters of the load specification while resource tests are being applied to system resources, and these alterations can be immediately applied or can be applied at a next testing cycle after the currently running resource tests have run their course. For example, the daemon can receive a new load specification and/or changes to an existing load specification, can validate this newly received information, and pass on the information to appropriate test drivers (and activate and/or deactivate test drivers as necessary) implement via resource tests. The test drivers can be configured so that a test driver corresponds to only one system resource, and/or test drivers can be selected and configured to correspond to multiple system resources. For example, in an exemplary embodiment a test driver can run or drive a resource test for testing memory, such as volatile or non-volatile memory, and also a resource test for testing the CPU. By way of further example, a resource test can be designed to affect multiple resources—for example, a test that involves both intensive computation and large quantities of data could simultaneously exercise and test both the CPU and memory. The load specification can also indicate specific resource tests to be applied, and can indicate whether tests are to be applied sequentially or simultaneously to a particular system resource.

Figure 2:
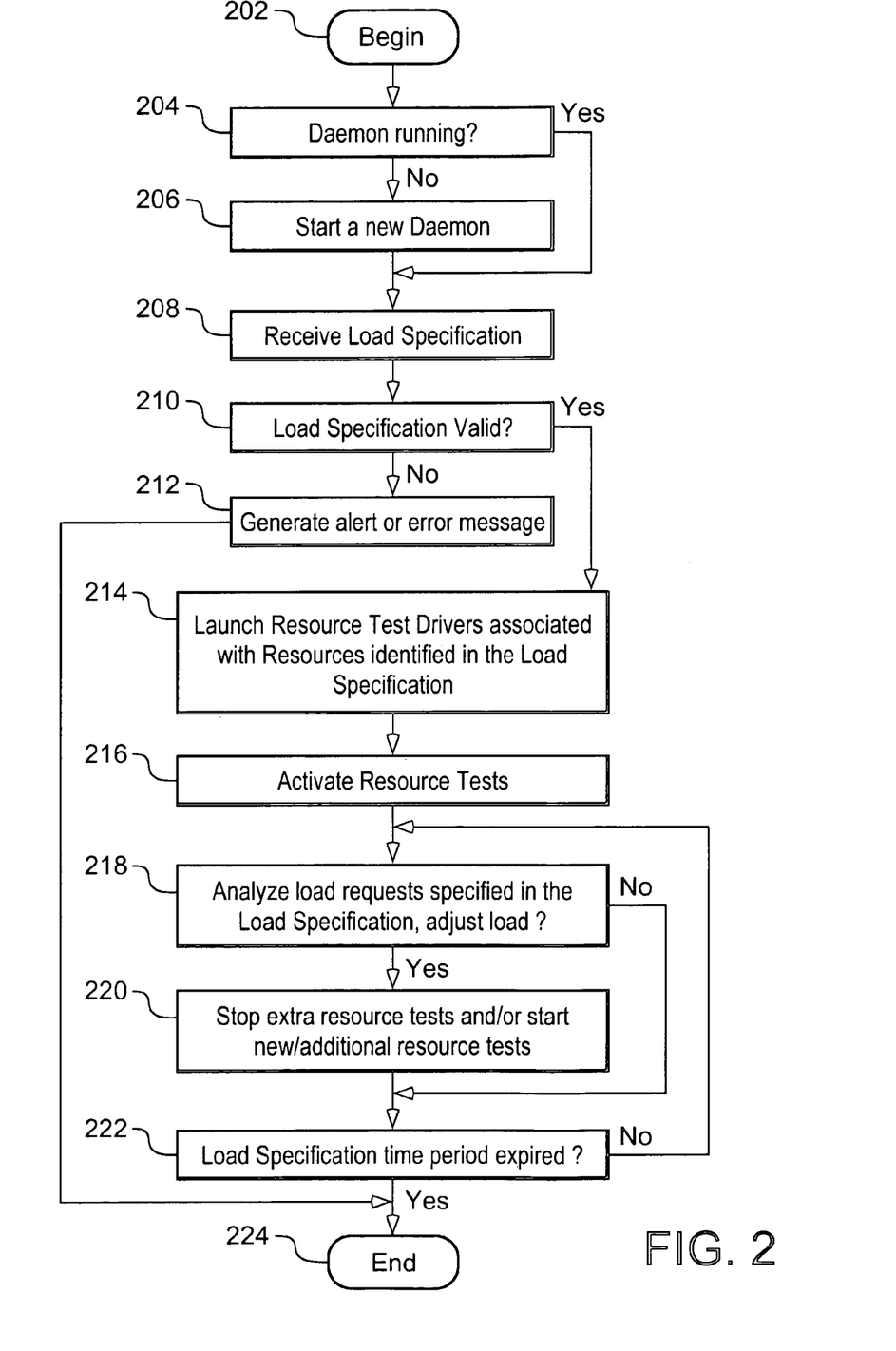
FIG. 2 illustrates another exemplary method.

FIG. 2 illustrates another exemplary process, which uses resource tests to apply loads to resources of a computer system under test, test drivers to run, supervise and adjust the resource tests, and a daemon to manage the test drivers and receive load specification information. As shown in FIG. 2, after a first beginning block 202 control proceeds to block 204, where a determination is made whether a daemon is running. If yes, then control proceeds to block 208. If not, then control proceeds to block 206, where a new daemon is started. From block 206, control proceeds to block 208. In block 208, a load specification is received, for example by the daemon. From block 208, control proceeds to block 210, where the load specification verified and validated. This can include, for example, the daemon reviewing or parsing and analyzing the load specification to check for proper syntax, values, completeness, and so forth. If the load specification is not valid, then control proceeds to block 212 where an alert such as an error message is generated to alert a user and/or a supervisory program, then control proceeds to block 224 where the process ends. Alternatively, if the load specification is not valid then control can return to block 208 from block 212.

If the load specification is valid, then control proceeds from block 210 to block 214 where resource test drivers associated with resources identified in the load specification are launched. From block 214 control proceeds to block 216, where resource tests are activated, for example by or under the direction of the launched resource test drivers. From block 216 control proceeds to block 218, where the load requests specified in the load specification are analyzed, and a determination is made whether to adjust the current load to match the load specified in the request. If not, then control proceeds to block 222. If yes, then control proceeds to block 220, where resource tests are stopped, started, and/or adjusted based on the determination of block 218. From block 220 control proceeds to block 222, where a determination is made whether a time period has expired. If not, then control returns to block 218. If yes, then control proceeds to block 224, where the process ends. The time period can, for example, be a test time period specified in the load specification. The analyzation of block 218 can also consider specific time durations or other time-related information concerning specific resource tests or resources, for example specified in the load specification, and make adjustments accordingly. For example, if a resource test is scheduled to be stopped or started at a particular point in time or at the beginning or end a specified time period, that stopping or starting can be performed in block 220.

Figure 3:
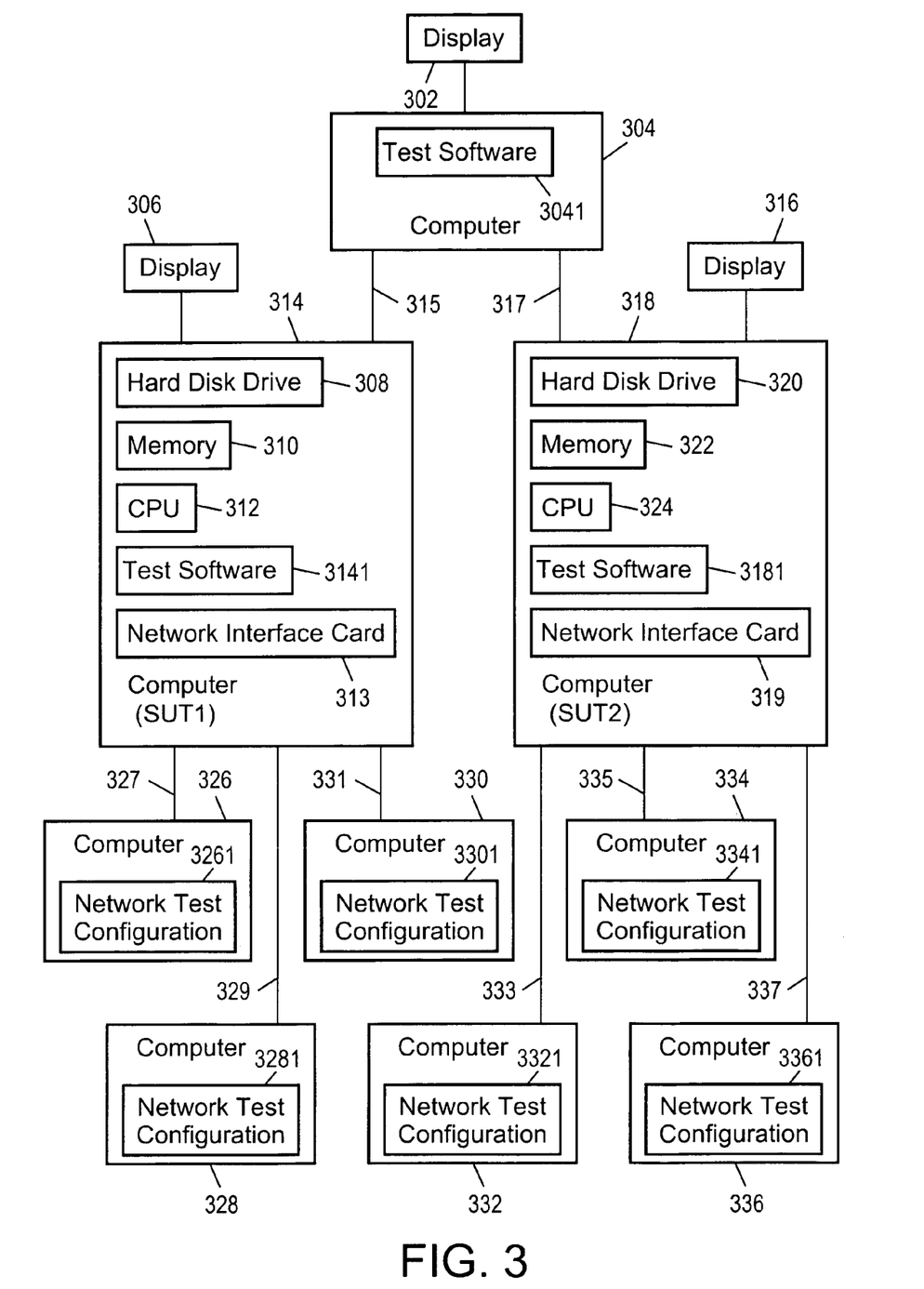
FIG. 3 illustrates an exemplary embodiment.

FIG. 3 illustrates an exemplary embodiment. In particular, FIG. 3 shows a computer system under test, SUT1 (314) connected to computers 326, 328, 330 via network links 327, 329, 331 respectively. SUT1 also includes a hard disk drive 308, a memory 310, a CPU 312, a network interface card 313 and test software 3141, and is connected to a display 306. The memory 310 can include or be implemented with one or more of Random Access Memory (RAM), volatile memory, and static memory. Although FIG. 3 only shows SUT1 containing one data storage drive (the hard disk drive 308), SUT1 can include multiple disk drives, and the drive(s) can be of one or more types including hard drives, optical drives, floppy disk drives, tape drives, and so forth. In addition, although FIG. 3 shows SUT1 with only one network interface card 313, SUT1 can include multiple network interface cards, and each network interface card can include multiple ports.

In an exemplary embodiment, the test processes described herein, for example with respect to FIGS. 1-2, are performed by the test software 3141 running on SUT1. Network test configuration information 3261, 3281, 3301 applied on the computers 326, 328, and 330 allows the computers 326, 328, 330 to interact with SUT1 and thereby test the network links 327, 329, 331 by applying a network I/O load. One or more of the network links 327, 329, 331 can be selected for testing, whereby test data is directed through the selected network link(s). The network test configuration information can, for example, cause the computers 326, 328, 330 to receive and transmit test data over the network links 327, 329, 331 to apply a traffic load and test the network links, for example in response to specific commands or queries received from the test software 3141 running on SUT1 the network test configuration information can be any data, software or other mechanism that causes the computers 326, 328, 330 to apply a traffic load to specified network links connecting to SUT1 in accordance with the load specification being executed.

A separate computer 304 running test software 3041 and connected to SUT1, can provide various loads to SUT1, and/or can control, coordinate and/or monitor operation of the test software 3141 running on SUT1. The separate computer 304 can provide load specifications and related information such as updates or alternations to the test software 3141 running on SUT1, and thereby exercise or apply loads to, SUT1. The test software 3041 can be a full package equivalent for example to the test software 3141 and 3181, or can include only monitoring and control functions. The test software 3041, 3141, 3181 can be configured to each perform some or all of the test processes and functions described herein, for example with respect to FIGS. 1-2.

The separate computer 304 can also be connected to one or more additional systems under test, for example SUT2 shown in FIG. 3, so that the separate computer 304 can coordinate or run testing operations on multiple systems under test, sequentially or simultaneously as desired. The testing operations described herein can be performed separately, variously, in central or distributed fashion among the test software units or modules on the computers shown in FIG. 3. For example, a user can create or upload a load specification on any one of the computers 314, 304 and 318, for transmission to and execution on one of the other computers, some resource tests can be run on the computer system under test, other resource tests can be run on systems or devices separate from the system under test (e.g., on one or more of the computers shown in FIG. 3), and resource tests run in one location can be monitored or controlled from another location, for example by a network driver and/or daemon running on a different system.

In an exemplary embodiment, the computers 304, 314, 318 or any other computer connected to SUT1 or SUT2 can monitor various loads of SUT1 and SUT2, and can provide indications of the monitored load to one or more of the test software 3141, 3181, 3041 of SUT1, SUT2 and the computer 304 respectively, via the links shown or via other communication links. The monitoring software can be part of the test software 3141, 3181, 3041, or can be separate software (for example, the off-the-shelf monitoring software mentioned herein), and can be implemented for example on any computer connected to SUT1 or SUT2, for example one or more of the computers 326, 328, 330, 332, 334, 336. The displays 302, 306, 316 can form a graphical user interface for receiving load specification information from a user, and for presenting status information and control options to the user, for example monitored load levels and selectable load levels.

SUT2 is shown with a similar configuration to that of SUT1, and includes a hard disk drive 320, a memory 322, a CPU 324, a network interface card 319, and test software 3181. As shown in FIG. 3, SUT2 is also connected to a display 316 (for example, a cathode ray tube, liquid crystal display, and so forth) and is connected to computers 332, 334, and 336 via network links 333, 335, 337. As with SUT1, SUT2 can include multiple data storage devices or drives, multiple network interface cards, and so forth. The computers 332, 334, 336 can include network test configuration information 3321, 3341, and 3361 that performs similar functions to the network test configuration information of the computers 326, 328, 330. Those skilled in the art will realize that each of the computers shown in FIG. 3 can also include other devices or resources capable of testing via the methods disclosed herein, for example optical drives, floppy disk drives, and so forth.

Figure 4:
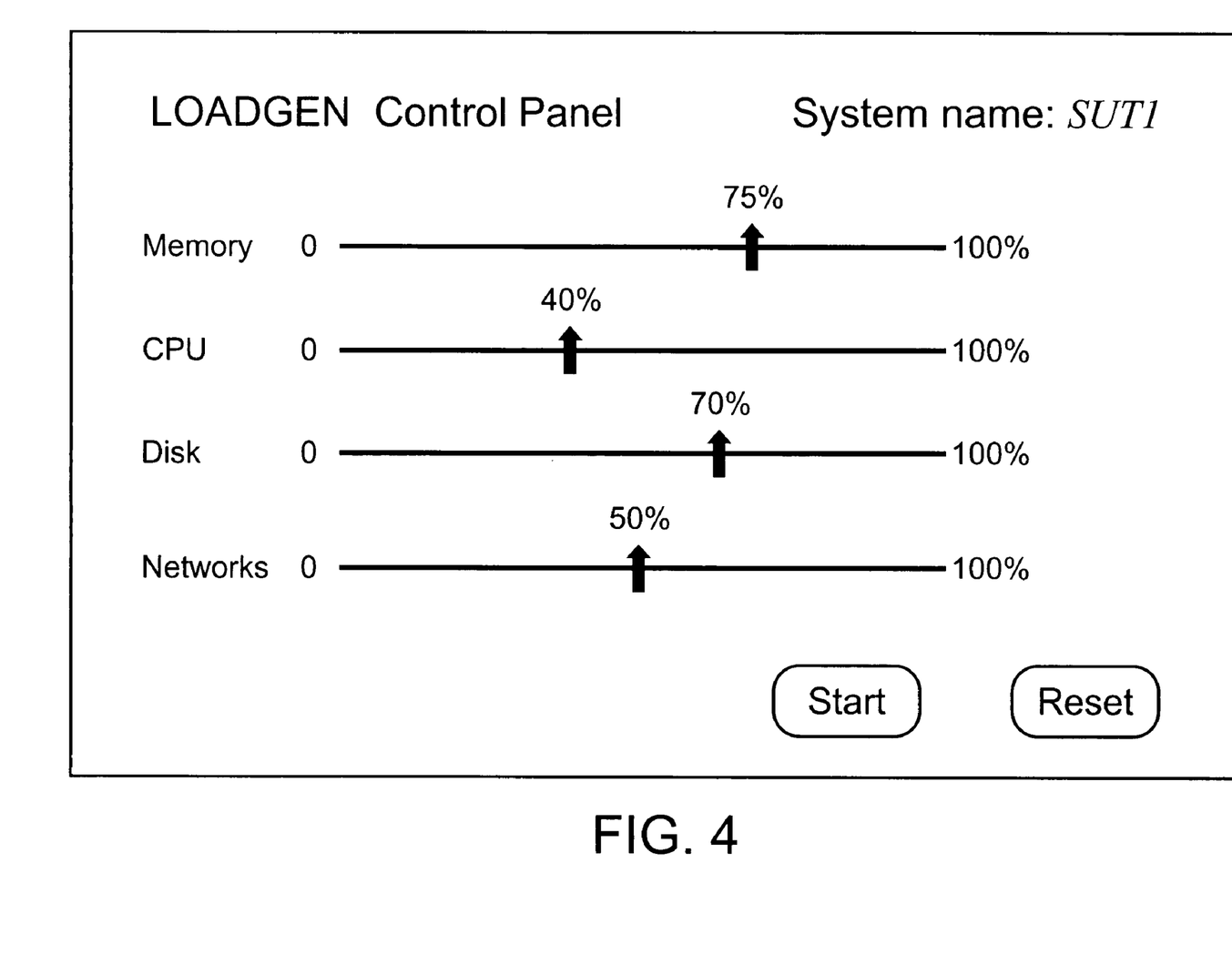
FIG. 4 illustrates an exemplary Graphical User Interface (GUI).

FIG. 4 shows an example GUI that a user can employ to define or alter a load specification. As shown in FIG. 4, the GUI can include listing of labels and/or images representing resources to be tested, for example memory, CPU, disk, and network. The GUI can also include a possible or available load range for each resource, and an indication of a selected load level for each resource. As shown in FIG. 4, the range can be represented by a bar and a pointer or mark on the bar can represent a selected value in the range. For example, FIG. 4 shows the bar corresponding to memory having a marker at the selected value of 75% where the bar shows a range from 0% to 100%. FIG. 4 shows similar features for the resources of CPU, disk and network, where the selected load values are 40%, 70% and 50% respectively. Also included in the GUI of FIG. 4 are "Start" and "Reset" buttons that the user can select to initiate or halt execution of a selected set of load values that define a load specification. Other features can be included in the GUI, and other graphical techniques or mechanisms can be used to represent and receive information.

Resource tests, test drivers and related issues will now be discussed in greater detail with respect to an exemplary embodiment referred to as "LOADGEN", which includes a test daemon, a set of test drivers, and resource tests. LOADGEN is a tool that allows a user to generate controlled and focused resource load on a computer system, for example an HP-UX system. LOADGEN can be used in conjunction with a real-world-like application to generate desired load mixes and patterns for exercising the computer system.

A test area is a general test category. Within each test area there will be one or more tests that exercise the particular test area. Most of the test areas can refer to resources such as the memory test area, the cpu test area, the network test area and the disk test area.

A resource test is an actual test that stresses a particular resource or test area. There can be more than one resource test per test area. Not every test area needs a resource configuration file. For example, for disk test, which disk and/or which file system for test can be specified in the resource configuration file, so the disk test knows which device to use in testing. But for memory testing, no memory specification is required.

A test driver can manage resource tests, the testing schedule and the test level in one test area. There can be a test driver for each test area. A sub test is a resource test that has the same load focus as another resource test and is managed by the same test driver. If a test area has two or more resource tests that are managed by the same test driver, those resource tests are known as sub tests.

"loadgend" refers to a load generation daemon that is the program responsible for managing a user's test requests.

LOADGEN can use controllable focused Resource Tests. These tests can be focused, and can be artificial. Artificial tests can be used in conjunction with a real-world-like application. For example, the artificial tests can be applied at the same time a real-world application is running on the system under test, to provide an additional or "background" load that the system must handle. As described herein, the additional load can take the form of massive data transfers over network connections to the system under test, for example FTP (File Transfer Protocol) traffic, disk accesses, tasks that require CPU resources of the system under test, and so forth. For example, artificial testing can help determine how large or capable a server in a system should be, in order to handle specified loads while providing a level of performance acceptable to the customer Or operator of the system under test.

The Resource Tests can be carefully designed to allow LOADGEN to provide a user with the ability to test a real-world application in many different conditions. Specifically, the user controls generation of a targeted load. For example, LOADGEN allows users to schedule system resource usage by creating system resource schedule queues. The user can exercise complete control over how he/she creates this schedule of resource tests. The user also has great flexibility in specifying or selecting how the resource tests behave especially with regard to the characteristics of test duration and resource usage level. These capabilities allow the user to test a system in different ways. For example, the user can create a resource spike, a condition where a large percentage of the specified resource is used for a period of time, and where the rate of change of the use percentage is large. The user can also create sustained resource usage that occurs, for example, when a user-specified portion of the resource is acquired and held for a relatively long period of time.

Figure 6:
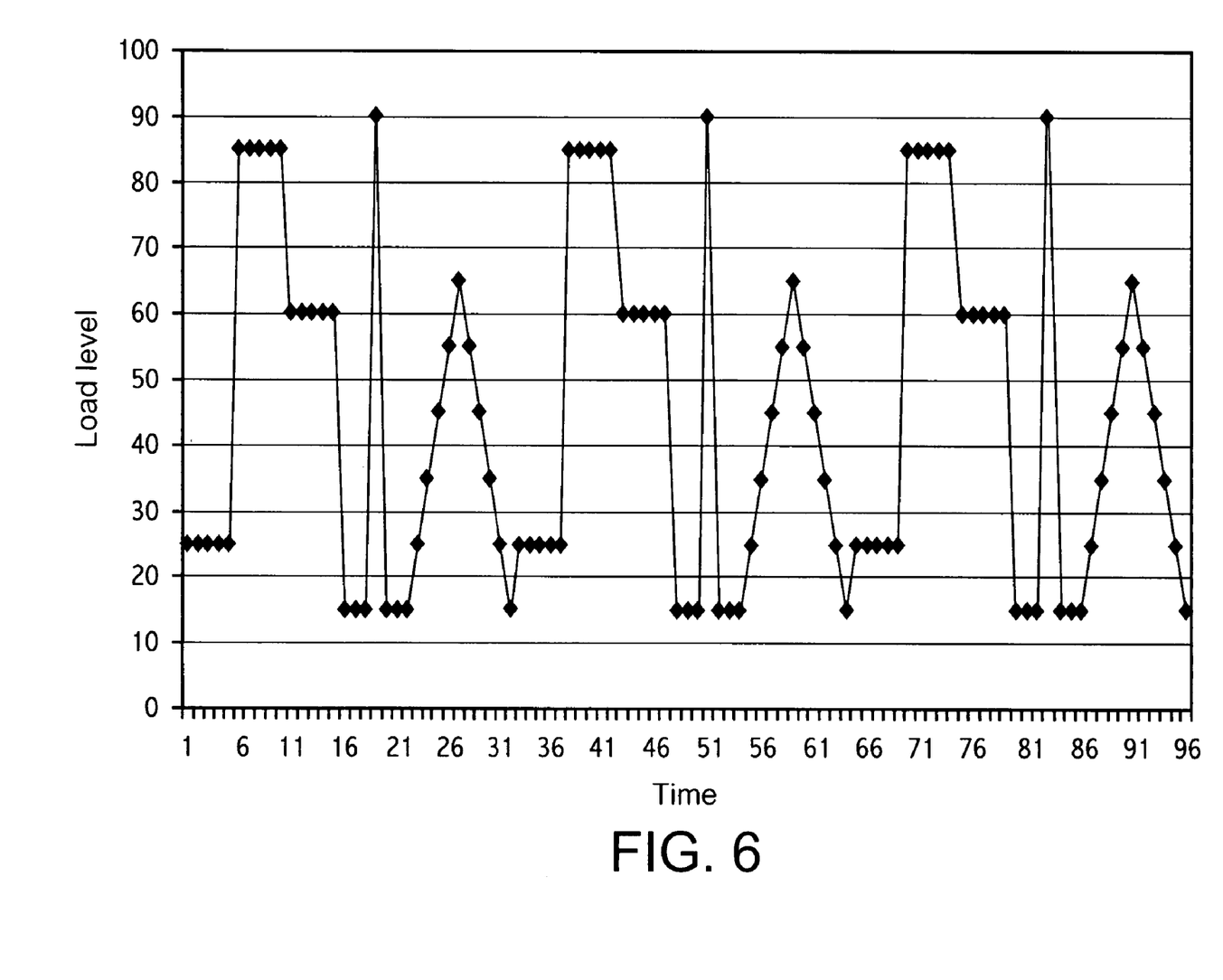
FIG. 6 illustrates an exemplary load pattern.

FIG. 6 illustrates an exemplary load pattern, wherein the load level is represented in percentage points of a load range from zero to 100% along the y-axis, and time is represented along the x-axis. The time units can be seconds, minutes, or larger or smaller units of time. As shown in FIG. 6, the same load pattern repeats three times, and includes "spike" loads where the load level changes rapidly. This load pattern as well as other load patterns can be applied to any of the resources of the system under test.

The LOADGEN tool can include three major components. A first component is the daemon, "loadgend". This daemon program manages a user's test requests and communicates with the test driver(s), and sends appropriate test schedules to the test drivers. A second component is formed by test drivers. Each test driver manages a testing schedule and resource test load or usage levels in one test resource area. Test drivers can be started and stopped by loadgend. A third component includes resource test. Each resource test can focus on stressing one resource area. A resource test can be managed by the test driver for that resource area. Note that if two or more resource tests (existing within the same test area) have the same load focus and are managed by the same test driver, then each test can be known as a "sub test".

The LOADGEN tool can grow to support any number of test areas or resources. Exemplary test areas or resources include, but are not limited to: memory; CPU; disk I/O; and network (e.g., network I/O).

The LOADGEN can support two different modes: Configuration file mode, and Interactive mode. In the Configuration file mode, the tool receives a file containing a load specification, for example a complete or sufficient load specification. In the Interactive mode, a user can create a load specification and/or modify an existing load specification, for immediate or later use. For example, a load specification created by the user in the Interactive mode, can later be used as the load specification in the Configuration file mode.

Figure 5:
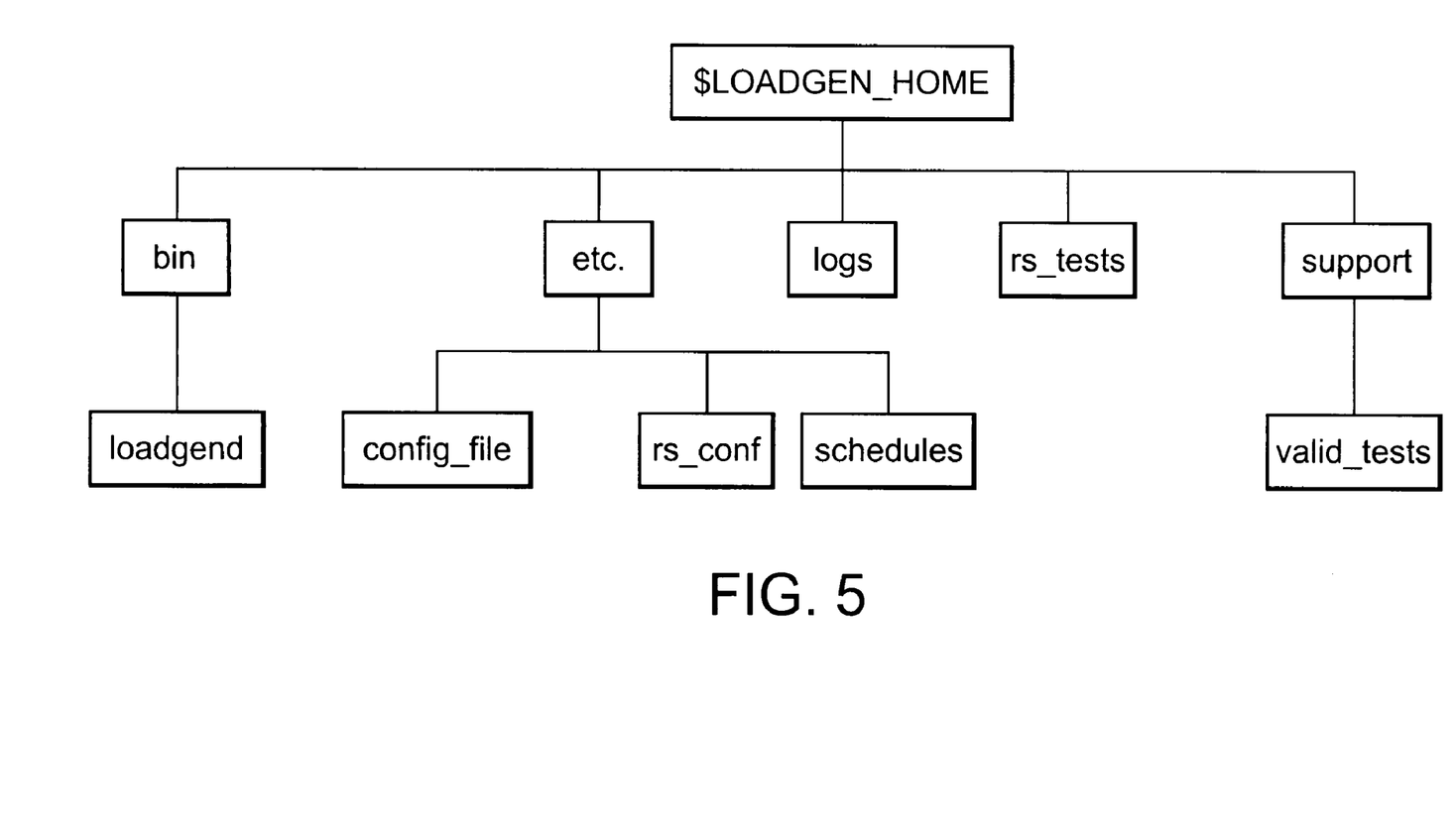
FIG. 5 illustrates an exemplary file structure.

With respect to file layout, LOADGEN can be installed on a dedicated file system. An environment variable, LOADGEN_HOME, can specify a directory for LOADGEN where LOADGEN can be installed. If the user does not explicitly set LOADGEN_HOME, the system can default to /var/opt/loadgen. Please note that if the user installs LOADGEN into a directory other than /var/opt/loadgen, he MUST correctly set LOADGEN_HOME. FIG. 5 illustrates an exemplary file layout branching from LOADGEN_Home, including "bin", "loadgend", "etc.", "config_file", "rs_conf", "schedules", "logs", "rs_tests", "support", and "valid_tests".

The bin directory contains the LOADGEN daemon, loadgend. It also contains any LOADGEN tools the user may need. Such tools can include but are not limited to test result analysis tools, report generation tools, and so forth. The etc directory contains a configuration file template, a directory (rs_conf) for the various resource configuration files, and a directory (schedules) for the test schedules.

The logs directory contains a log file (loadgen.log) for the LOADGEN daemon loadgend, plus a log directory for each test area. That is, each test area or resource has its own log directory where its log files are stored. For example, if the user schedules a memory test, the logs directory contains a directory called memory, and in that directory will be at least one file called memory.log. A test area can have as many log files as it needs. The rs_tests directory contains a directory for each resource test area. Those directories contain the actual resource tests. For example, rs_tests can include a directory called memory, which contains a file called memory_test. The support directory contains any files or data needed by LOADGEN.

There are four command invocations supported in configuration file mode: 1) loadgend -f <config_file>, which executes tests specified in <config_file>; 2) loadgend -r test_name <test_name>, which restarts test(s) by rereading test schedules; 3) loadgend -i, which displays the current running profile; and 4) loadgend -k <test_name test_name>, which kills all tests (running and scheduled) as well as the loadgen daemon (loadgend), or only kill specified tests. If the user specifies -f, but does not include a configuration file, loadgend can use the default configuration file at $LOADGEN_HOME/etc/config_file.

In the configuration file mode, the user can control testing with three types of files: 1) a single configuration file specifying tests to run; 2) test schedules, for example one test schedule per test area; and 3) resource test configuration files, for example one resource test configuration file per test area.

In an exemplary Configuration File Syntax, the configuration file includes various entries, with one entry per line. Each entry must be a comment or a test specifier. Specifically, a comment is any line beginning with "#" is a comment, and is ignored during operation. A test specifier indicates which tests the user wishes to run. A test specifier can have the following exemplary syntax: Test <Test Name> <Test Schedule>, where the <Test Name> can be any valid test, for example any test in a list of valid tests.

In an exemplary Test Schedule Syntax, a Test Schedule includes a series of entries having four possible formats: 1. test_duration and load_level; 2. Loop; 3. Stop; and Forever load_level.

In particular, test_duration is a value that specifies how long the requested test will run at the specified load level. It is of the format hhhhh:mm:ss, where hhhhh is a number of hours ranging from 00000 to 99999, mm is number of minutes ranging from 00 to 59, and ss is number of seconds ranging from 00 to 59. The value load_level describes how much of the specified resource should be consumed, and can be a value from 0 to 100, where a value of 0 means none of the resource is consumed, and where a value of 100 means all (or more realistically as much as possible) of the system resource is consumed. A value of 0 can be used to create gaps between test invocations. A user may need to be careful when specifying large load_levels since may be possible the system is not responsive at such high loads. The value load_level can be used when testing memory, for example by attempting to consume (load_level) % of the physical memory of the system. The value load_level can also be used when testing a CPU, for example by attempting to run (load_level) % of time and sleep for the rest of the time.

For each resource test, there can be a corresponding resource configuration file residing in $LOADGEN_HOME/etc/rs_conf/<test_name>. Resource configuration files can be used by their own test driver, and the format and content can be unique for each test area.

To demonstrate the usage of the configuration file, consider the following exemplary Configuration File:

Configuration File Example: $LOADGEN_HOME/etc/config_file
Test Memory, Network and CPU but not Disk
Test Memory /var/opt/loadgen/etc/schedules/mem_variable
Test CPU cpu_spikes -continued Test Network $LOADGEN_HOME/etc/schedules/network_consistent
Test Disk
Memory Test Schedule example:
$LOADGEN_HOME/etc/schedules/mem_variable
do a variable test in a 4-hour cycle
01:00:00 30
00:30:00 60
00:30:00 20
00:30:00 0
00:30:00 40
00:30:00 20
00:30:00 50
Loop
CPU Test Schedule:$LOADGEN_HOME/etc/schedules/cpu_spikes
Do some different spikes in a 2-hour cycle
00:01:00 25
00:01:00 30
00:01:00 35
00:01:00 40
00:01:00 45
00:01:00 50
00:01:00 55
00:01:00 60
00:01:00 65
00:01:00 70
00:20:00 0
00:05:00 80
00:25:00 0
00:05:00 50
00:05:00 80
00:05:00 50
00:30:00 0
00:05:00 80
00:10:00 0
Loop
Network Test Schedule:
$LOADGEN_HOME/etc/schedules/network_consistent
Run a medium load of network test all the time
Forever 50
3.2 LOADGEN Commands
3.2.1 loadgend -f
To start loadgend, you must use the -f option:
loadgend -f <config_file>

If the user enters a valid-f command and loadgend is not already running (there is no file /var/run/loadgend.pid or the file does not have a valid pid), loadgend can do the following:

1. loadgend will be started and its pid will be saved in the file /var/run/loadgen.pid.
2. Save the configuration file name.
3. Read the user specified (or default) configuration file and do syntax checking of the configuration file and test schedules.
4. Invoke the test driver (mapped by the test name) with one parameter, the fully qualified pathname for the schedule file loadgend will remember the pid for all the test drivers it invokes.
5. If loadgend is already running when the user enters a -f command, this new invocation of loadgend will print an error message and exit. It will not affect the currently running loadgend.

The loadgend can be killed using "loadgend -k", e.g. having the format: loadgend -k <test_name test_name . . . >. If the loadgen daemon is not running, the parameter of <test_name test_name . . . > is ignored. Command "loadgend -k" will do nothing to the system, but can return an error message saying loadgen daemon is not running. Without the parameter <test_name test_name . . . > in the command, if the loadgen daemon is running, then the loadgen daemon informs the user that the loadgen daemon is running and asks the user if he really wants to kill loadgen daemon. If the user answers affirmatively, loadgen daemon can send a SIGTERM signal to all running test drivers. Upon receiving this signal, all test drivers will terminate all their tests and exit. Once all test drivers exit, loadgen daemon will remove /var/run/loadgen.pid and exit. If at least one test_name is specified in the command line, then loadgend will ensure that all test_name(s) are running. If any test is not running, loadgend will inform the user that the specified test(s) are not running and exit. If all specified tests are running, loadgend can query the user if he wishes to kill the specified test(s). If the user answers affirmatively, loadgend will send a SIGTERM signal to the appropriate test driver(s). Upon receiving this signal, the test driver(s) will terminate all their tests and exit. In this case, the loadgen daemon will NOT be killed.

Running tests and a current test schedule can be modified using a "loadgend -r" command having the format:

```
loadgend -r test_name <test_name>...
```

The "test_name" should be one of the entries in a file valid_tests that lists valid tests. Minimally one test_name is required in this command. The user can specify any number of tests up to the number of supported tests. If the loadgen daemon is not running, command "loadgend -r" will do nothing to the system, and can return an error message indicating that the loadgen daemon is not running. If the loadgen daemon is running and the specified tests are running too, then the loadgen daemon can inform the user that the loadgen daemon is running and tests are running, and can ask the user if he really wants to restart <test_name . . . > tests. If the user answers affirmatively, loadgen daemon will do the syntax check on the running schedule of the specified the test_name(s). Once the syntax check is passed, the loadgen daemon will send "SIGHUP" signal to the corresponding test drivers. Upon receipt of the signal, the test drivers stop the current schedule and re-read the test schedule file and the resource configuration file, and then modify the current running tests: Depending on the particular design or implementation of a test, the test can be re-tuned or stopped and re-started. If the loadgen daemon is running and the specified tests are not running, then the loadgen daemon will re-open the current running configuration file and find the test schedule for the specified tests. Once the test schedule file for the specified test is located, the loadgen daemon will launch the test driver for the specified test with the test schedule file. If the test schedule file for the specified test is not specified in the configuration file, then loadgen daemon will print an error message and exit.

Note that "loadgend -r" cannot take new schedule files, but the test driver will re-open the test schedule file and resource configuration file and re-start the test correspondingly. Thus the command "loadgend -r" can be used if the user needs to change the resource configuration file and/or modify the current test schedule. If a user wants to start a brand new test schedule, the following procedure can be used:
1. Create a new test schedule
2. Modify resource configuration file if necessary
3. "loadgend -k test_name" to stop the current schedule
4. Replaces the old schedule with new schedule file name in the current configuration file.
5. "loadgend -r test_name" to re-start a test schedule.

To get information about the current running profile, the command "loadgend -i" can be used with format loadgend -i. This command will not change any currently running test and will not change the loadgen daemon. It will display the running configuration file name and the list of currently running tests.

With respect to Test Drivers, each supported test area as specified in a file valid_tests can conceptually have a Resource Test driver with name <test_name>_test under $LOADGGENHOME/rs_tests/<test_name>/<test_name>_test. Test drivers are responsible for managing test schedules and starting and stopping the actual resource tests. A test driver handles at least two signals from the loadgen daemon: 1) SIGTERM: Terminate all tests and exit; and 2) SIGHUP: Stop the current schedule and re-open the test schedule file and resource configuration file and modify the current running tests. The main task for test drivers is to handle load_level of the tests. A test driver must split up test invocations into manageable sizes so that it can control load_level increases and decreases. To explain this concept further, consider the Memory Test and the Memory Test driver. The Memory Test can be a simple program that consumes a specified amount of physical memory. If the user requests a load_level of 30, the Memory Test Driver computes what 30% of physical memory is, and decides how much memory needs to be consumed. If each resource test process takes up 1% of the actual memory, then instead of making one call to the Memory Test, the Memory Test driver will invoke the Memory Test 30 times to apply a load_level of 30. This can give the user much greater control over physical memory usage. To continue with the example, the user now wishes to run the Memory Test at load_level 20. The Memory Test driver will see that 30 copies of the Memory Test are currently running, and to get to 20% physical memory usage, it will need to kill 10 of the 30 copies of the Memory Test. Resource tests can be designed or configured to apply load in increments different than 1%, for example smaller or larger increments. Note also that there does not have to be a separate Resource Test driver and Resource Test. It is quite possible to have a Resource Test that performs duties or functions of both a driver and a resource test.

Resource Tests must be designed or configured to be controllable in some quantitative manner. For example, the Memory resource test can be configured to be able to allocate and lock a user-specified amount of physical memory. In an exemplary embodiment, each resource test is focused to affect only one resource. Resource tests can also be designed or configured to primarily affect only one or more specified resources, and minimally affect other resources.

In the Memory Test area, an exemplary Memory Test can do the following: calculate how much physical memory is in the system; calculate how much physical memory is currently in use; calculate how much physical memory it should consume (e.g., in pages) based on load_level and the two values of available memory and memory in use; and then divide this value by load_level to generate a new value, mem. For each percentage point of load_level, a program can be executed to consume the mem amount of memory. That is, if the user requests a load_level of 30%, then the Memory Test will invoke 30 separate processes that each allocate and lock about 1% the memory. Each child process that the test driver spawns simply allocates 1% of the total system memory, attempts to lock it into RAM using mlock( ), and then sleeps forever. Note that mlock( ) failures are not considered to be errors, since the user cannot lock 100% of the system's RAM.

When a schedule file entry is finished, and a new one is executed, child processes are spawned or killed in order to match the new level. For example, if the schedule contained entries for a level of 50%, then 80%, and then 60%, the memory test would spawn 50 child processes (50%), wait the specified amount of time, then spawn 30 more (80%) and wait that specified amount of time, and then kill 20 child processes (60%).

In the CPU test area, an exemplary CPU test can perform CPU-intensive operations, such as bit-shifts, integer and floating point arithmetic, AND/OR/XOR operations, conditional branching, typecasting, and other CPU instructions. The CPU test can avoid I/O and other blocking system calls as much as possible. In an exemplary embodiment, the test driver parent process spawns one child process per processor to perform the work. Load level represents the percentage of the time that the CPU test's child processes are running as opposed to sleeping. This is can correspond with a % CPU field displayed by the program "top". (For example, if the load level is 100, the CPU test never sleeps. If the load level is 0, it is asleep almost all the time. If the load level is 50, then for every 50 clock cycles it runs, it also sleeps for 50 clock cycles.) The CPU test can have a routine which the child processes use to do all their CPU operations. When the test first starts up, the test driver process runs this routine in a loop, to determine how many clock-ticks this routine takes. Thus when it first starts up, there will be a spike in the CPU load, which can last about one second, while the CPU test times the specific system presently under test. Note that the clock ticks used by this routine are not the same as the real time it takes to run this routine; it should not matter whether or not the system is already busy when the test starts up. Once the CPU test knows how many clock ticks its CPU routine uses, it knows how many clock ticks to sleep for between calls to this routine, in order to achieve the desired level. These sleeps between calls to the CPU routine can be accomplished using a function such as nanosleep( ). After each schedule file entry is finished, all the child processes are killed. The next schedule file entry causes new child processes to be spawned, one per processor, running at the new level.

In the disk test area, an exemplary disk resource test can include two multi-threaded sub-tests. The first sub-test can be a read/write test which performs disk operations (for example, open( ), write( ), fsync( ), pread( ), lseek( ), and close( )) on user specified files in a block-buffered or "cooked" file system. The fsync( ) call forces a physical write to disk. In a situation where the file system is cooked, the pread( ) is from buffer cache rather than from the physical disk. The second sub-test can be a read-only test that performs similar disk operations (e.g., open( ), pread( ), lseek( ), close( )), but on an uncooked or "raw" file system. Unlike the first sub-test, physical read operations are performed because file system is raw.

The load level for these disk resource tests can be managed by inserting nanosleep( )'s between sets of disk operations. By carefully monitoring system response time, the disk resource test attempts to perform work for X % of a time period, and sleep for (100–X) % of the time period. For example, for a load level of 50, the test can perform one set of disk operations and then sleep for the same amount of time (averaged over 100 iterations) that it took to perform those operations. This results in 50% work, 50% sleep.

With respect to Disk Resource Configuration Files, two separate resource configurations can be used for the disk resource tests: one for the read-write test; and one for the read-only test. Fully qualified path names can be specified on separate lines of a disk_rw.conf file as follows:

```
###############################################################
# disk_rw will write, read, and unlink a 4k file. Each "test"
# file must be explicitly listed here. USE A FULLY QUALIFIED
# PATHNAME/FILENAME

# Example:
# /tmp/disk_test.tmp
# /mnt/d001/disk_test.tmp

# NOTE: The directory and filename must be accessible. This
# test will not create the subdirectories. If open( ) fails
# with the path/file that you have provided, the test thread
# for that file will not execute.
###############################################################
###############################################################
# INSERT FILENAMES HERE
###############################################################
/tmp/disk_test.tmp
/mount1/tmp/disk_test.tmp
/mount2/tmp/disk_test.tmp
```

Fully qualified raw device files can be specified in a disk_read.conf file for the read-only test, for example in the following format:

```
###############################################################
# This is the read-only version of the disk test. In order to
# force physical reads (vs. reads from buffer cache), we open
# the raw disk device file. The devices are specified by the
# user, so make sure that you use the correct RAW device file.

# Example:
# /dev/rdsk/c1t6d0
# /dev/rdsk/c2t6d0

# NOTE: If open( ) fails on the device file, the test thread
# for that file will not execute.

# NOTE2: If you do not want the read test to run, do not
# include any file raw device files below.
###############################################################
###############################################################
INSERT RAW DEVICE FILES HERE
###############################################################
/dev/rdsk/c1t0d0
/dev/rdsk/c4t4d0
```

Due to the stressful nature of these tests, in an exemplary embodiment only one file or file system per hardware path should be specified. The above example assumes that /tmp, /mount1, /mount2, /dev/rdsk/c1t0d0, and /dev/rdsk/c4t4d0 are on physically separate disks. If a user desires to not execute one or both of the sub-tests, any file names or device files can be omitted from the corresponding configuration files. If disk_rw.conf or disk_read.conf do not contain valid targets, the test will not be executed.

In a Network Test Area, an exemplary network resource test can use the "netperf" benchmark to provide network traffic on the user specified interfaces. Although localhost can be used for this test, traffic will most likely occur between the SUT (System Under Test) and one or more remote systems.

A Network Resource configuration file can be divided into two sections, a basic configuration section and an advanced configuration section. A user may choose to forego the advanced configuration section, and only modify the "basic" section. Exemplary valid keywords for this configuration file are defined below. The keywords are case insensitive and in the format of "KEYWORD=VALUE", where no white space is allowed around the equal sign.

A first keyword "REMOTE_HOST" defines an IP address or hostname that will be used as the remote node for the netperf benchmark. One or more REMOTE_HOST's may be defined. If no REMOTE_HOST is defined, the test will exit. Another keyword, "MAX_LOAD", Defines a number of netperf instances that correspond to a load_level 100 of network test. When 100% network load is difficult to achieve, the term "really busy" can be accurate. Another keyword, "NP_TEST", defines the specific netperf tests to be run. Three TCP_RR (request/response) tests can be defined by default. Based on the load_level in the schedule file and MAX_LOAD in the resource configuration file, the number of netperf instances to run for load_level can be the ceiling integer of (load_level % * MAX_LOAD). Thus a network test can be specified where the lowest load level is running one instance of netperf.

An actual exemplary resource configuration file can define three remote hosts using IP addresses and hostnames. The remote hosts do not need to reside on separate subnets. In fact, the remote hosts do not even need to be unique. In the advanced section, MAX_LOAD is set to 5. This means that if a load_level of 100 is specified in the test schedule, 5 instances of netperf will be started simultaneously on all three REMOTE_HOST's. Thus, a total of 15 netperf's will be started. The NP_TEST keyword defines the specific netperf tests that will be run. Netperf has the ability to run UDP and TCP tests in request/response mode and stream mode. By default, the network test will run three tests in TCP request/response mode. The test that is to be run is selected randomly from the list of NP_TEST's. The duration of each test is a maximum of 5 minutes. If the test schedule defines test durations of greater than 5 minutes, a number of 5-minute tests will be run back-to-back with each test being selected randomly from the NP_TEST pool.

The actual exemplary resource configuration file can take the form:

```
################################################################

Basic configuration
################################################################

REMOTE_HOST=192.100.1.1 # 100bt interface
REMOTE_HOST=192.100.1.2 # same interface, different host
REMOTE_HOST=host02 # Gigabit interface to host02
################################################################

Advanced configuration
################################################################

MAX_LOAD=5 # number of netperf instances that equals 100% load
################################################################

Netperf test configuration
################################################################

# Netperf tests to be run - DO NOT ADD COMMENTS ON THE SAME LINE
# this is the -t portion of the netperf command line:
# netperf -l 60 -H 172.24.3.102 -t TCP_RR -- -r 20,500 -s 0 -S 0

# i.e in the above case, we'd grab "TCP_RR -- -r 20,500 -s 0 -S 0"

# format: NP_TEST=netperf_options(no quotes)
################################################################

NP_TEST=TCP_RR -- -r 20,500 -s 0 -S 0
NP_TEST=TCP_RR -- -r 500,20 -s 0 -S 0
NP_TEST=TCP_RR -- -r 4096,4096 -s 0 -S 0
```

Returning to a discussion of LOADGEN, when in the Interactive Mode LOADGEN provides the user with the ability to test the various resource tests in a direct manner, and allows the user to combine tests and use different parameters to create appropriate test scenarios. With this approach the user can determine which tests to use and which values to use with a particular test. The user can then save this information to a configuration file.

Once LOADGEN is started, the daemon loadgend will start on the System-Under-Test (SUT). Loadgend can run in the background on the SUT, waiting for users' inputs. Loadgend accepts and validates a user's test requests and communicates with the test driver, and sends the appropriate test schedule to the test driver. The following exemplary pseudocode can be used to implement daemon loadgend described herein:

```
Loop { /wait for user's input
    Interprets the user's input in the following cases: {
        Case 1:Start test with a new configuration file {
            Check syntax of the configuration file and schedule files.
            If pass the check {
                Launch the corresponding test driver with schedule
                file name.
                Record the test driver's PID (process identifier).
                Write to loadgend logfile.
                Update the test information file.
                (test information file records the current running
                test info).
            } else {
                Exit with an error message.
            }
        }
        Case 2:Stop running test {
            Check the syntax of the request.
            If failed, exit with error message.
            Else {
                Send SIGTERM to the corresponding test driver to
                stop test
                (using pre_recorded test driver's PID).
                Write to loadgend logfile.
                Update the test information file.
            }
        }
        Case 3:Change current testing {
            Check the syntax of the configuration file and schedule
            files.
            If pass the check {
                Send SIGHUP to the corresponding test driver (PID)
                to stop the
                current schedule with the new schedule file.
                Write to loadgen logfile.
                Update the test information file.
            }else {
                Exit with an error message
            }
        }
        Case 4:Print out current test information {
            Print out the current running test information.
        }
```

-continued

```
Case 5:Exit loadgend {
    Send SIGTERM to all running test drivers to stop all
    running tests.
    Write to loadgend logfile.
    exit.
}
```

Each test driver manages a test schedule in one test resource area. Test drivers can be started and stopped only by the daemon loadgend. A test driver validates the resource configuration file when applicable, interprets test schedule requests, compares specified load(s) with the current load on the system, and decides when and what resource tests to run or to stop. The following exemplary pseudocode can be used to implement test drivers described herein:

```
Set the current_load_level=0
Set the current_test_duration=0
Check the resource configuration file (e.g., when applicable).
Log the resource (pass to test later).
Open the schedule file.
Read line by line { /*skipping the comment line
    Check for keywords (loop, forever and stop)
    If it is "stop" {
        Stop all running resource tests.
        Exit.
    } if it is "loop" {
        move the file pointer to the beginning of the file.
    } if it is "forever" {
        set the next_load_level from the line in the file.
        calculate the difference=next_load_level-current_load_level.
        if the difference>0 {
            wait for the current_test_duration.
            determine how many resource tests to add and
            launch them.
            stop reading the file by point the file pointer
            to the end of the file.
        } if the difference <0 {
            wait for the current_test_duration.
            determine how many resource tests to stop and
            terminate them.
            stop reading the file by point the file pointer
            to the end of the file.
        } /If it is 0, do nothing
    } else { /regular schedule line
        set the next_load_level from the line in the file.
        set the next_test_duration from the line in the file.
        calculate the difference=next_load_level-current_load_level.
        if the difference>0 {
            wait for the current_test_duration.
            determine how many resource tests to add and
            launch them.
            set the current_test_duration=next_load_duration.
            set the current_load_level=next_load_level.
        } if the difference <0 {
            wait for the current_test_duration.
            determine how many resource tests to stop and
            terminate them.
            set the current_test_duration=next_load_duration.
            set the current_load_level=next_load_level.
        }
    }
}
```

Test drivers need to also handle 2 signals while running:

SIGTERM:
    Terminate all tests and exit.

SIGHUP:
    Stop the current schedule file parsing.
    Start to parse the new schedule file.

Resource Tests can each focus on stressing one test area. A resource test can be managed by its own test driver. To effectively generate desired loads in the LOADGEN framework-described herein, resource tests can satisfy the following requirements. First, each resource test is controllable in some quantitative manner, so the test can be dynamically respond to the load level. The definition of load level can be very specific to each resource test; it can be part of resource test design. Second, each resource test can be focused and only affect that resource, as far as possible. For example, if the resource test is a memory test, then the design should avoid using any extra CPU time as much as possible. For example, for a memory resource test we can define a load level of X to obtain or allocate X % of the physical memory. In this case, the user should be careful to schedule high load numbers since it is possible the test can burden the system in a very unstable stage. The following exemplary pseudocode can be used to implement a Memory Test:

Calculate how much physical memory is in the system.
Calculate how much physical memory is currently in use.
Calculate how much physical memory it should consume (in pages) based on load_level and the above two values (memory in the system, and memory in use).
Divide the amount of memory to consume by load_level to obtain a new value, mem.
For each one percentage of load_level, execute a program to consume the mem amount of memory. (That is, if the user requests a load_level of 30%, then the Memory Test will invoke 30 separate processes that allocate and lock about 1% the memory).

Each child process that the test driver spawns simply allocates 1% of the total system memory, attempts to lock it into RAM (Random Access Memory) using mlock( ), and then sleeps forever. (Note that mlock( ) failures are not considered to be errors, since you cannot lock 100% of the system's RAM.) When a schedule file entry is finished, and a new one is executed, child processes are spawned or killed in order to match the new level. For example, if the schedule contained entries for a level of 50%, then 80%, and then 60%, the memory test would spawn 50 child processes (50%), wait the specified amount of time, then spawn 30 more (80%) and wait that specified amount of time, and then kill 20 child processes (60%).

It is possible to use an existing test for a resource test as long as the test can respond to load level and focus on the test area. For example, consider a network test A which generates certain traffic on a specified link. To re-use the network test A as a network resource test, first define the load level. One way to do this is to pre-define one way to execute A which generates a known amount traffic on the link, for example 5%. Then each load level of 5 is one process of this test. So to obtain a load level of 20, four processes of A are invoked or set in play simultaneously. In this case, load level 15 and 16 have no difference because there is insufficient resolution or granularity, so in this design the granularity requirements of the load level need to be understood to effectively or accurately apply the resource test.

The methods, logics, techniques and pseudocode sequences described above can be implemented in a variety of programming styles (for example Structured Programming, Object-Oriented Programming, and so forth) and in a variety of different programming languages (for example Java, C, C++, C#, Pascal, Ada, and so forth).

Those skilled in the art will appreciate that the elements and methods or processes described herein, can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method for testing a computer system by applying a load, the method comprising: receiving a load specification, the load specification identifying at least one resource of the system and specifying a load for application to the resource; and for each resource identified in the load specification, applying the corresponding specified load to the resource, wherein the load specification indicates whether the plurality of tests are performed sequentially or simultaneously.

2. The method of claim 1, wherein the specified load includes an indication of load magnitude and load duration for each identified resource.

3. The method of claim 2, wherein the specified load includes an indication of a beginning and an ending of the load duration.

4. The method of claim 2, wherein the specified load indicates variation of the load magnitude over the load duration.

5. The method of claim 2, wherein the indication of load magnitude is a value representing a percentage of a maximum load for the corresponding resource of the system.

6. The method of claim 2, wherein the load specification specifies at least one resource test for applying each specified load, the method comprising:
receiving and validating the load specification;
activating a test driver for each identified resource; and
the test driver running a specified resource test to apply a specified load to a corresponding system resource.

7. The method of claim 6, wherein a different test driver is activated for each identified resource.

8. The method of claim 6, comprising:
the test driver monitoring the computer system to determine a magnitude of the load applied to an identified computer system resource by a specified resource test;
the test driver comparing the determined load magnitude with the specified load magnitude; and
the test driver controlling the running of the specified resource test based on the comparison.

9. The method of claim 6, wherein a process performs the receiving, validating and activating.

10. The method of claim 9, wherein the process is a daemon.

11. The method of claim 1, wherein the load is one of a load for volatile memory, a load for static memory, a load for disk drive input/output, a load for network input/output, and central processing unit.

12. The method of claim 1, wherein the load specification indicates a test that when performed applies a specified load to a corresponding resource.

13. The method of claim 12, wherein the load specification indicates a plurality of tests for applying the specified load to the corresponding resource.

14. A device for testing a computer system by applying a load, the device comprising:
software installed on the computer system, wherein the software is configured to receive a load specification, the load specification identifying at least one resource of the system and specifying a load for application to the resource, and wherein for each resource identified in the load specification, the software is configured to apply the corresponding specified load to the resource;
means for monitoring a load of the at least one resource based on a daemon; and
a display for displaying at least one of the monitored load and the load specification.

15. The device of claim 14, wherein the specified load includes an indication of load magnitude and load duration for each identified resource.

16. The device of claim 15, wherein the load specification specifies at least one resource test for applying each specified load, the software comprising:
a test driver for running a specified resource test to apply a specified load to a corresponding system resource; and
a process for receiving and validating the load specification, and for activating a test driver for each identified resource.

17. The device of claim 16, wherein the process is configured to activate a different test driver for each identified resource.

18. The device of claim 17, wherein the process is a daemon.

19. The device of claim 14, wherein the identified resources include:
a volatile memory;
a static memory;
a disk drive input/output;
a network input/output; and
a central processing unit.

20. The device of claim 14, comprising a graphical user interface for receiving load specification information from a user.

21. A machine readable medium comprising a computer program for causing a computer to perform: receiving a load specification, the load specification identifying at least one resource of the system and specifying a load for application to the resource; and for each resource identified in the load specification, applying the corresponding specified load to the resource, wherein the load specification indicates whether the plurality of tests are performed sequentially or simultaneously.

22. The medium of claim 21, wherein the specified load includes an indication of load magnitude and load duration for each identified resource.

23. The medium of claim 22, wherein the specified load includes an indication of a beginning and an ending of the load duration.

24. The medium of claim 22, wherein the specified load indicates variation of the load magnitude over the load duration.

25. The medium of claim 22, wherein the indication of load magnitude is a value representing a percentage of a maximum load for the corresponding resource of the system.

26. The medium of claim 22, wherein the load specification specifies at least one resource test for applying each specified load, the method comprising:
    receiving and validating the load specification;
    activating a test driver for each identified resource; and
    the test driver running a specified resource test to apply a specified load to a corresponding system resource.

27. The medium of claim 26, wherein the receiving, validating and activating are performed by a process.

28. The medium of claim 27, wherein the process is a daemon.

29. The medium of claim 26, wherein a different test driver is activated for each identified resource.

30. The medium of claim 26, comprising:
    the test driver monitoring the computer system to determine a magnitude of the load applied to an identified computer system resource by a specified resource test;
    the test driver comparing the determined load magnitude with the specified load magnitude; and
    the test driver controlling the running of the specified resource test based on the comparison.

31. The medium of claim 21, wherein the load is one of a load for volatile memory, a load for static memory, a load for disk drive input/output, a load for network input/output, and central processing unit.

32. The medium of claim 21, wherein the load specification indicates a test that when performed applies a specified load to a corresponding resource.

33. The medium of claim 32, wherein the load specification indicates a plurality of tests for applying the specified load to the corresponding resource.

34. A testing system for testing a computer system, the testing system comprising:
    means for applying to at least one computer system resource identified in a load specification, a corresponding load specified in the load specification, wherein the load specification specifies a magnitude of the load; and
    means for monitoring a load experienced by the at least one resource based on a daemon.

35. The testing system of claim 34, comprising:
    means for validating the load specification; and
    means for displaying at least one of the monitored load and the load specification.

* * * * *